United States Patent [19]

Steinhüser

[11] Patent Number: 4,989,900
[45] Date of Patent: Feb. 5, 1991

[54] APPARATUS FOR ADJUSTING THE LEVEL OF THE DEFLECTOR FOR A SHOULDER BELT IN THE OCCUPANT RESTRAINT SYSTEM OF AN AUTOMOTIVE VEHICLE

[75] Inventor: Günter Steinhüser, Glückstadt, Fed. Rep. of Germany

[73] Assignee: AUTOLIV-KOLB GmbH & Co., Dachau, Fed. Rep. of Germany

[21] Appl. No.: 457,200

[22] Filed: Dec. 28, 1989

[30] Foreign Application Priority Data

Dec. 29, 1988 [DE] Fed. Rep. of Germany ........ 3844258

[51] Int. Cl.⁵ .............................................. B60R 22/00
[52] U.S. Cl. ..................................... 280/808; 280/801
[58] Field of Search ................................. 280/801, 808

[56] References Cited

U.S. PATENT DOCUMENTS

| | | | |
|---|---|---|---|
| 3,713,137 | 3/1968 | Prinz et al | 242/107 |
| 4,241,886 | 12/1980 | Maskawa | 242/107 |
| 4,469,352 | 9/1984 | Korner et al. | 280/808 |
| 4,470,618 | 9/1984 | Ono | 280/808 |
| 4,500,115 | 2/1985 | Ono | 280/808 |
| 4,538,832 | 9/1985 | Anderson | 280/808 |
| 4,652,012 | 3/1987 | Biller et al. | 280/808 |

Primary Examiner—Kenneth R. Rice
Attorney, Agent, or Firm—Peter K. Kontler

[57] ABSTRACT

The frame of the motor vehicle carries a vertical rail defining an elongated track for a plastic slide which carries a first pivotable lever serving as a means for releasably coupling the slide to the rail. A pivot member which secures the first lever to the slide carries a deflector for the shoulder belt of the occupant restraint system, and the first lever has a tooth which is biased against one of two sidewalls of the rail to enter into one of a row of sockets in the one sidewall. A second lever or a wheel is provided to extract the tooth from a selected socket and to thus enable the slide to move along the track to a different position in which the tooth is aligned with a different socket. The first lever is centered between the two sidewalls which flank the track for the slide. The central portion of the first lever resembles or constitutes a disc with two convex surfaces which are closely adjacent the respective sidewalls and have centers of curvature on or close the pivot axis of the first lever.

41 Claims, 4 Drawing Sheets

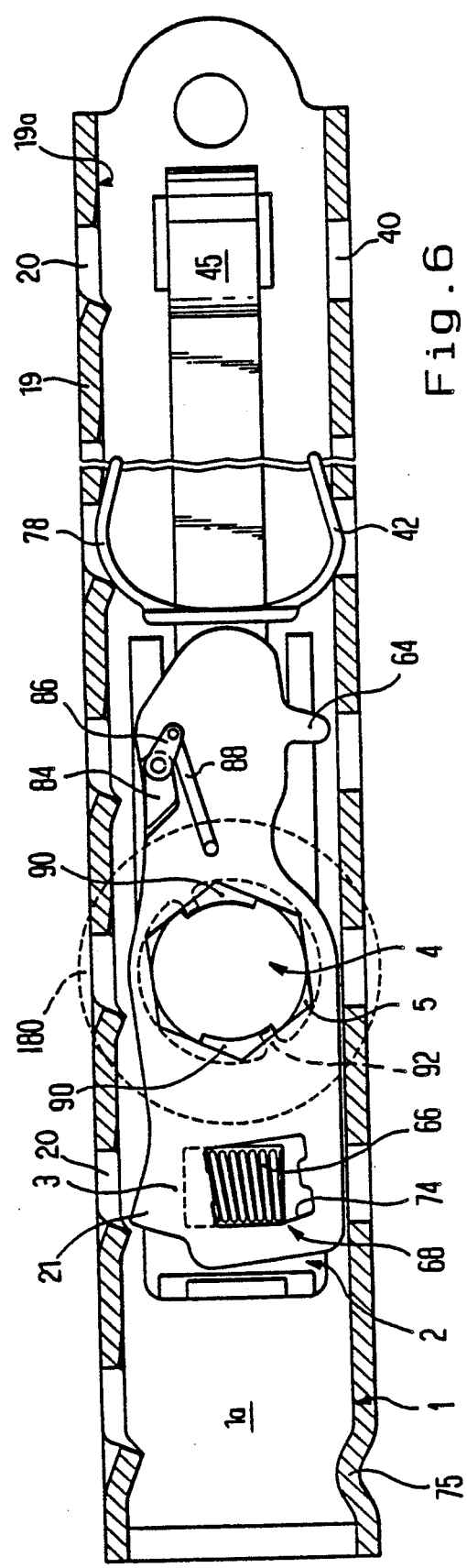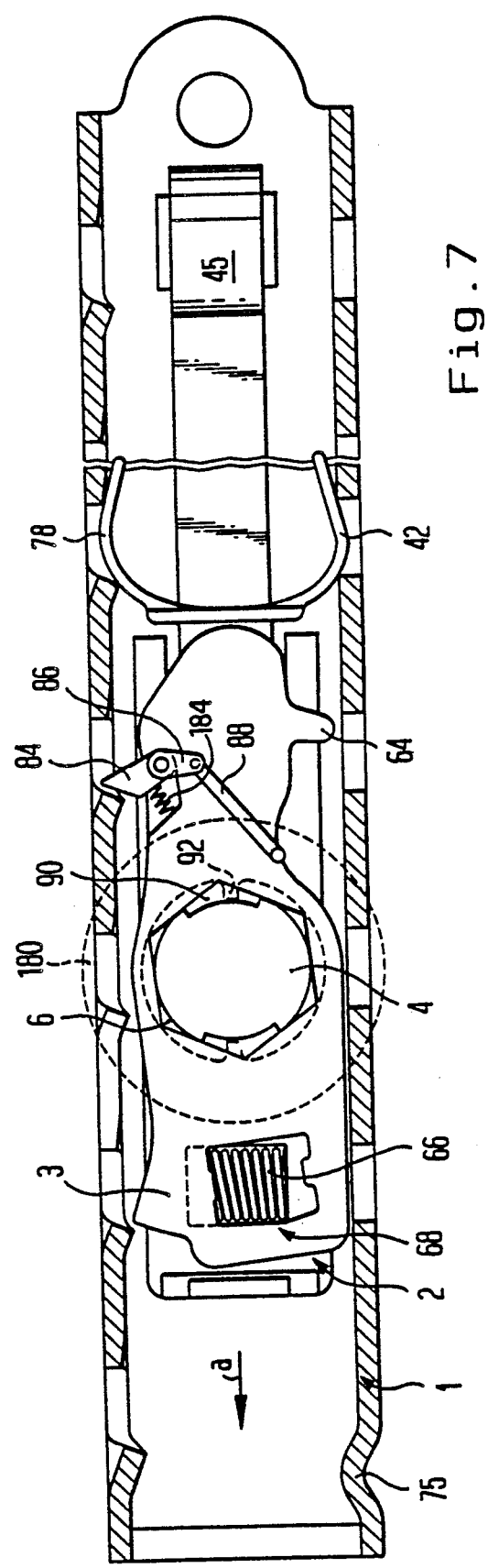

APPARATUS FOR ADJUSTING THE LEVEL OF THE DEFLECTOR FOR A SHOULDER BELT IN THE OCCUPANT RESTRAINT SYSTEM OF AN AUTOMOTIVE VEHICLE

BACKGROUND OF THE INVENTION

The invention relates to occupant restraint systems for use in automotive vehicles, for example, in road vehicles. More particularly, the invention relates to improvements in apparatus for selecting the level of a deflector for a shoulder belt or strap of an occupant restraint system.

Published German patent application No. 37 13 137 discloses an apparatus wherein a slide is movable up or down in a substantially vertical rail and carries a pivotably mounted level which can be moved to a position of engagement with or disengagement from the rail. The pivot member for the lever carries a deflector for a shoulder belt. A spring is provided to permanently bias the lever away from engagement with the rail. One end of the shoulder belt is connected to the rotary spool or reel of a standard retractor, and the other end of the shoulder belt carries a customary tongue which can be inserted into a buckle after the belt has been caused to overlie the chest of the occupant of the respective seat in a motor vehicle. When the shoulder belt is subjected to a pull, the lever on the slide is caused to move downwardly and is pivoted relative to the slide so that its tooth enters one of a row of slots in the rail. The rail is affixed to the so-called B-column of the frame of the motor vehicle. A bowden wire is used to change the level of the slide in the track which is defined by the rail, and the adjustment of the level of the slide by way of the bowden wire takes place in automatic response to forward or rearward adjustment of the respective seat in the motor vehicle. The bowden wire can be withdrawn against the resistance of a spring. A force which acts upon the shoulder belt to extract a length of the belt from the retractor must overcome the bias of the spring which acts upon the bowden wire, as well as the resistance of the spring which acts upon the lever, in order to ensure that the projection of the lever will enter a slot of the rail. The apparatus which is disclosed in the German patent application is rather complex and expensive.

OBJECTS OF THE INVENTION

An object of the invention is to provide a novel and improved apparatus which can be used to adjust the level of a deflector for the shoulder strap or belt of an occupant restraint system for use in a motor vehicle.

Another object of the invention is to provide a simple, compact and reliable apparatus which can be used as a superior substitute for existing apparatus.

A further object of the invention is to provide an apparatus which is less likely to jam than a conventional level adjusting apparatus.

An additional object of the invention is to provide an apparatus which can be manipulated by hand to select an optimum level for the deflector of a shoulder belt so that the person occupying the respective seat or intending to occupy the seat is in a position to select an optimum level of the deflector for the purposes of convenience and safety.

Still another object of the invention is to provide the apparatus with a novel and improved slide and with a novel and improved device which releasably couples the slide to a part of the vehicle frame.

A further object of the invention is to provide a novel and improved apparatus of the above outlined character wherein the means for separably coupling the slide, which carries the deflector, to the frame of the motor vehicle can establish a highly reliable disengageable connection between the slide and the frame of the motor vehicle.

An additional object of the invention is to provide a novel and improved method of manipulating the above outlined coupling device.

Another object of the invention is to provide a novel and improved method of indicating to the operator that the slide is in the process of moving the deflector for a shoulder belt with reference to the frame of the motor vehicle.

An additional object of the invention is to provide a novel and improved guide for the slide of the above outlined level adjusting apparatus.

Another object of the invention is to provide one or more safety devices which serve as a last resort to establish a reliable connection between the deflector and the frame of the motor vehicle in an emergency, particularly in the event of a collision and/or overturning of the vehicle.

SUMMARY OF THE INVENTION

The invention is embodied in an apparatus for changing the level of a deflector for a shoulder belt or strap in an occupant restraint system for use in a motor vehicle. The improved apparatus comprises a guide (e.g., an elongated metallic rail having a substantially C-shaped cross-sectional outline) which is connectable to or can be installed in the body of a motor vehicle and defines an elongated track which is substantially vertical in upright position of the vehicle. The guide has two sidewalls which are preferably exactly parallel to each other and flank the track. One of the sidewalls has a plurality of preferably (but not necessarily) equidistant sockets (e.g., in the form of elongated closed slots extending all the way through the one sidewall) which are spaced apart from each other in the longitudinal direction of the track, and the apparatus further comprises a slide or carriage which is installed in the guide for movement along the track. The apparatus also comprises means for separably coupling the slide to the guide, and such coupling means comprises a (first) lever having at least one arm including a projection (e.g., in the form of a tooth or pallet) adjacent the one sidewall to enter or leave a selected socket in response to pivoting of the lever about an axis which is normal to the track and is disposed substantially midway between the sidewalls. Still further, the apparatus comprises deflector-supporting pivot means defining the aforementioned axis and secured to the slide. The lever may but need not be rotatably mounted on the pivot means and preferably includes substantially mirror symmetrical centering portions which flank the pivot means; each of these centering portions is preferably closely or immediately adjacent a different one of the two sidewalls, and the apparatus still further comprises means for yieldably biasing the lever for pivotal movement about the axis which is defined by the pivot means in a first direction to urge the projection against the one sidewall and into a selected socket in response to movement of the slide along the track to a position in which the projection is in register with the selected socket. The apparatus also comprises means for pivoting the lever about the axis in a second direction counter to the first direction to thus withdraw the projection from a selected socket preparatory to movement of the slide along the track.

The width of the track (as measured transversely of the axis) is preferably constant, and the centering portions of the lever preferably include convex surfaces which are adjacent the respective sidewalls. The centers of curvature of such convex surfaces are on or close to the axis which is defined by the pivot means. The lever can include a substantially disc-shaped section, and the centering portions preferably form part of such disc-shaped section.

The pivoting means is movable between an operative and an inoperative position, and the biasing means is free to maintain the projection in contact with the one sidewall or in a selected socket in the inoperative position of the pivoting means.

In accordance with a presently preferred embodiment, the lever of the coupling means has two arms one of which is provided with the projection and the other of which is engaged by the pivoting means. The pivoting means can comprise a second lever which is pivotably mounted in or on the slide and has a first arm engaging the lever of the coupling means and a second arm which is accessible to the hand of a person (e.g., the occupant of a seat in a motor vehicle) to facilitate pivoting of the second lever relative to the slide. The lever of the coupling means can be provided with a substantially V-shaped or L-shaped cam groove for the first arm of the second lever. The cam groove includes two mutually inclined legs and a junction between the legs. The second lever assumes an inoperative position (in which the biasing means is free to maintain the projection in abutment with the one sidewall or in a selected socket) when the first arm of the second lever extends into the junction of the cam groove. Means can be provided for releasably holding the second lever in the inoperative position, and such holding means can comprise one or more springs which react against the slide and bear against the second lever.

Means can be provided for biasing the slide longitudinally of the track toward a predetermined position, and such biasing means can comprise a torsion spring. The latter ensures that a person wishing to adjust the level of the deflector must exert a force only to move the slide in one direction (against the opposition of the just mentioned biasing means).

The other sidewall can be provided with a plurality of recesses (e.g., in the form of elongated closed slots) which are spaced apart from each other in the longitudinal direction of the track. The mutual spacing of the recesses can match or closely approximate the mutual spacing of the sockets, and the slide can be provided with at least one resilient follower having a portion which extends into one of the recesses when the projection of the lever of the coupling means extends into one of the sockets.

The slide can contain or consist of plastic material and preferably includes a plurality of sections which are connected to each other. The sections can constitute plastic extrusions or moldings and can include elongated shell-shaped first and second sections which extend longitudinally of the track. The lever of the coupling means is then disposed between the first and second sections of the slide.

Instead of having a substantially V-shaped or L-shaped cam groove, the lever of the coupling means can be provided with a substantially triangular cam groove, and the pivoting means can again comprise a second lever having a first arm which extends into the triangular cam groove and a second arm which is accessible for manipulation by a person, i.e., for pivoting of the second lever between operative and inoperative positions. When the second lever assumes its inoperative position (in which the means for biasing the lever of the coupling means is free to maintain the projection in abutment with the one sidewall or in a selected socket), the first arm of the second lever extends into a predetermined corner of the triangular cam groove. The means for releasably holding the second lever in the inoperative position (in which the first arm of the second lever extends into the predetermined corner of the triangular cam groove) can include at least one spring which reacts against the slide and bears against the second lever.

As mentioned above, the projection can resemble a tooth, and such tooth can be provided with a first flank having a first inclination relative to the longitudinal direction of the track, and a second flank having a less pronounced second inclination with reference to the longitudinal direction of the track. Such inclination of the tooth flanks facilitates penetration of the tooth into and its retention in a selected socket of the one sidewall.

The inner side of the one sidewall (i.e., the side which is adjacent the track) can be provided with ramps which are adjacent the sockets to direct the projection into the respective sockets when the biasing means for the lever of the coupling means is free to urge the projection against the one sidewall and the slide is caused to move longitudinally of the track in a predetermined direction. The sockets in the one sidewall have first and second end portions which are spaced apart from each other in the longitudinal direction of the track, and the one sidewall has surfaces which bound the first end portions of the sockets and preferably extend into the track to intercept the oncoming projection while the slide is caused to move in the predetermined direction. The ramps are adjacent the second ends of the respective sockets.

The lever of the coupling means can be provided with a second projection which extends into one of the recesses in the other sidewall of the guide when the first named projection extends into one of the sockets in the one sidewall. The two projections of the lever of the coupling means can be disposed substantially diametrically opposite each other with reference to the axis which is defined by the pivot means. If the lever of the coupling means has two arms, one of the projections is provided on the first arm and the other projection is provided on the second arm of such lever.

The lever of the coupling means can be provided with a first pocket (e.g., a window in the arm which carries the first named projection), and the slide can be provided with at least one second pocket adjacent the first pocket. The means for biasing the lever of the coupling means can comprise a spring (e.g., a coil spring) which is received in the pockets to react against the slide and to bear against the lever of the coupling means.

The sockets in the one sidewall of the guide preferably form a row including a first socket and a last socket (as seen in a predetermined direction longitudinally of the track). The guide of such apparatus can be provided with a stop which extends into the path of movement of the lever of the coupling means along the track in the predetermined direction to pivot the lever in the first direction and to thereby introduce the first named projection into the last socket of the row. The at least one arm of the lever of the coupling means (i.e., the arm which carries the first named projection) has a first side facing the one sidewall and a second side facing the other sidewall. The first named projection is provided at the first side of such arm, and the stop of the guide serves to engage the second side of the at least one arm.

The slide which pivotally supports the lever of the coupling means can be provided with two resilient followers one of which tracks the one sidewall and the other of which tracks the other sidewall of the guide. The one follower has a portion which rides over the sockets in response to movement of the slide longitudinally of the track, and the other follower has a portion which rides over the recesses in the other sidewall in response to movement of the slide longitudinally of the track. The mutual spacing of the recesses can match or approximate the mutual spacing of the sockets so that the aforementioned portion of the one follower rides over a socket when the aforementioned portion of the other follower rides over a recess and vice versa. To this end, each socket can be aligned with one of the recesses, as seen transversely of the track, and the two followers of the slide can be mirror symmetrical to each other with reference to a plane which extends longitudinally of the track and includes the axis for the lever of the coupling means. The aforementioned portions of the two followers can be arranged to generate noise in response to riding over the sockets and the recesses, respectively.

The slide can include a sleeve which extends from the track and surrounds a portion of the pivot means for the lever of the coupling means. The deflector for the shoulder belt surrounds such sleeve of the slide. The sleeve can be provided on one of the aforementioned first and second sections of the slide.

The pivot means can be non-rotatably connected with the lever of the coupling means, and the means for pivoting this lever can include means for turning the pivot means about the axis. The turning means can comprise a handle (e.g., a substantially wheel-shaped handle or a handle having a polygonal outline). The turning means is movable about the axis to and from an inoperative position in which the means for biasing the lever of the coupling means is free to urge such lever against the one sidewall, and the apparatus can further comprise an additional lever which is pivotably mounted on the lever of the coupling means, and means (e.g., a link train) for transmitting motion from the turning means to the additional lever in order to pivot the additional lever toward the one sidewall in response to movement of the turning means to the inoperative position and to pivot the additional lever away from the one sidewall in response to movement of the turning means from the inoperative position.

It is also possible to employ an additional lever which is pivotably mounted on the lever of the coupling means and is operative to engage the one sidewall and enter one of the sockets in response to abrupt movement of the slide along the track in a predetermined direction (e.g., in the event of a collision or another accident). The lever of the coupling means has a first side which confronts the one sidewall and a second side which confronts the other sidewall. In accordance with a presently preferred embodiment of the apparatus, the first named projection and the additional lever are disposed at the first side of the lever of the coupling means.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

FIG. 6 is a view similar to that of FIG. 4 but showing a portion of a third apparatus which constitutes a modification of the apparatus of FIGS. 4 and 5;

FIG. 7 is a view similar to that of FIG. 6 but showing an additional lever of the apparatus in a position of engagement with one sidewall of the guide.

DESCRIPTION OF PREFERRED EMBODIMENTS

Figure 3:
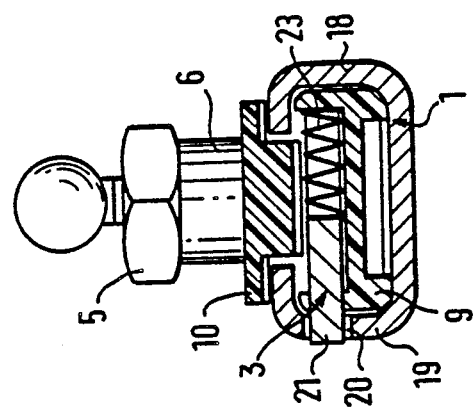
FIG. 3 is a transverse sectional view substantially as seen in the direction of arrows from the line III—III of FIG. 2.
Figure 1:
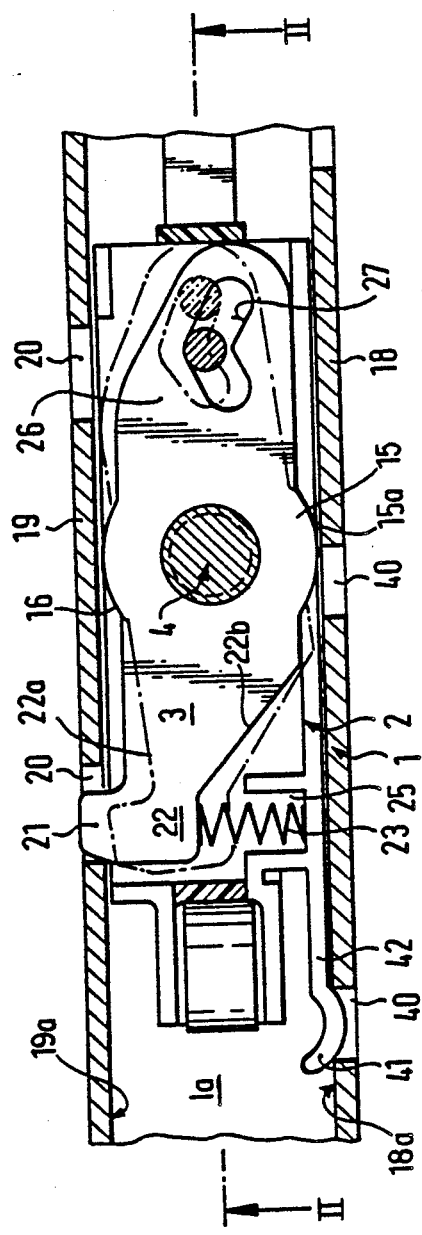
FIG. 1 is a fragmentary front elevational view of an apparatus which embodies one form of the invention, with certain parts of the apparatus shown in a vertical sectional view substantially as seen in the direction of arrows from the line I—I in FIG. 2.
Figure 2:
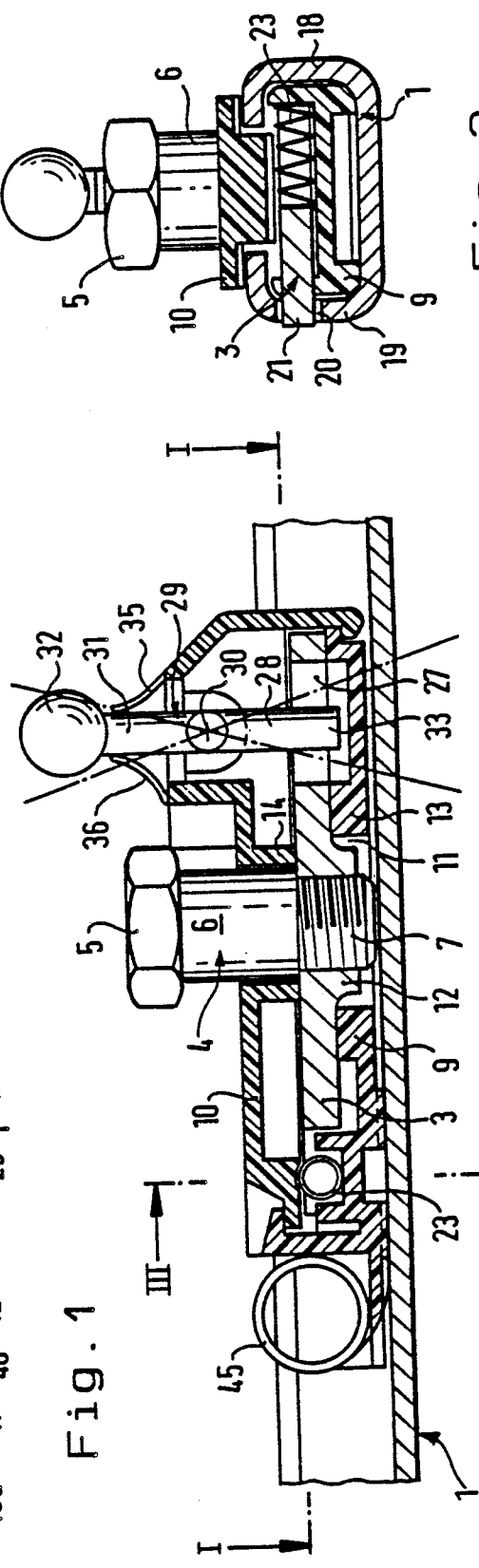
FIG. 2 is a sectional view as seen in the direction of arrows from the line II—II in FIG. 1.
Figure 8:
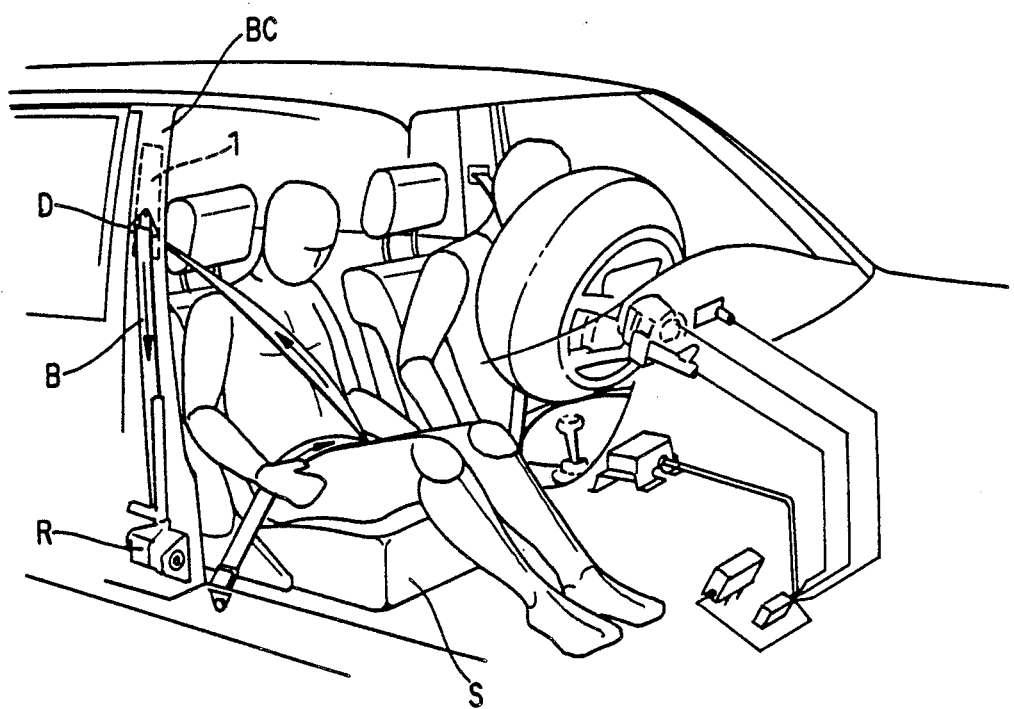
FIG. 8 is a fragmentary schematic perspective view of a portion of a motor vehicle and shows a shoulder belt, a deflector for the shoulder belt, and the position of the guide of the improved apparatus with reference to the deflector.

FIGS. 1 to 3 show certain details of an apparatus which embodies one form of the present invention. The purpose of the apparatus is to adjust the level of a substantially annular deflector D for a shoulder belt or strap B (see FIG. 8) so that the belt B will be more comfortable to and will better protect the occupant of the respective seat S in a motor vehicle. The apparatus comprises a vertical or nearly vertical guide 1 which is secured to or is installed in the so-called B-column or frame member BC (FIG. 8) of the frame of the motor vehicle. The illustrated guide 1 is an elongated metallic rail having a substantially C-shaped cross-sectional outline (see particularly FIG. 3) and defining an elongated track 1a flanked by two elongated parallel sidewalls 18 and 19. The track 1a of the guide 1 receives an elongated slide 2 which is made of or contains a suitable plastic material and includes two elongated substantially shell-shaped sections 9, 10 connected to each other and confining a pivotable lever 3 forming part of a means for separably coupling the slide 2 to the guide 1 in a selected position as seen longitudinally of the track 1a. The lever 3 is a two-armed lever and is pivotable about an axis extending at right angles to the longitudinal direction of the track 1a substantially or exactly midway between the sidewalls 18 and 19. The pivot means for the lever 3 comprises a pivot member 4 having a polygonal (e.g., hexagonal) head 5 which is spaced apart from the track 1a between the sidewalls 18, 19 of the guide 1.

The head 5 is outwardly adjacent a smooth cylindrical portion 6 terminating in an annular shoulder which abuts the adjacent surface of the lever 3. An externally threaded inner end portion 7 of the pivot member 4 is received in a tapped bore of the substantially disc-shaped central portion of the lever 3. The smooth cylindrical portion 6 is surrounded by the deflector D (not shown in FIGS. 1 to 3) for the shoulder belt B. The deflector D can swivel (i.e., perform a pendulum movement) about the axis of the pivot member 4 so that the inclination of its eyelet can change in dependency upon the orientation of that portion of the shoulder belt B which is being deflected by the part D. As a rule, the deflector D has a substantially triangular outline with the hole for the portion 6 in one of the corners and a slot for the shoulder belt B extending between the other two corners. The slot is bounded by suitably rounded surfaces of the deflector D to facilitate sliding movements of the shoulder belt B as well as to reduce the likelihood of damage to the belt. One end of the belt B is or can be connected to the spool or reel of a suitable retractor R shown in FIG. 8 (e.g., a retractor of the type disclosed in U.S. Pat. No. 4,241,886 granted Dec. 30, 1980 to Maekawa et al.), and the other end portion of the belt B can carry a tongue which is removably insertable into a buckle. The tongue can be of the type disclosed in commonly owned copending patent application Ser. No. 423,114 filed Oct. 19, 1989 by Knut Oberhardt. The retractor R can be installed in the column BC or elsewhere close to or at the floor level of the frame of the motor vehicle, and the buckle is affixed to the floor at the inner side of the respective seat S. The occupant restraint system which embodies the apparatus of the present invention can further include the structure which is disclosed in commonly owned copending paten application Ser. No. filed Dec. 15, 1989 by Walter Notar for "Apparatus for damping translatory and rotary movements" and in commonly owned copending patent application Ser. No. 242,910 filed August, 1988 for "Belt clamping apparatus for a seat belt system comprising a belt retractor".

As can be seen in FIG. 2, the means for preferably separably connecting the sections 9 and 10 of the slide 2 to each other comprises complementary male and female detent elements. Each of the sections 9, 10 can constitute an extrusion or a molding, depending on the nature of the machine which is used to mass-produce such parts. The sections 9, 10 define a chamber which receives the lever 3 of the coupling means with certain freedom of pivotal movement relative to the slide 2 and guide 1. The section 9 has an opening 11 which receives a ring-shaped axial extension 12 of the disc-shaped central portion of the lever 3. The extension 12 defines a portion of the tapped bore for the inner end portion 7 of the pivot member 4. The section 9 also comprises a ring-shaped extension or bead 13 which surrounds the opening 11 and serves as an abutment for the adjacent surface of the lever 3. The section 10 has an inwardly extending collar 14 which surrounds the inner part of the cylindrical portion 6 of the pivot member 4. The inner end face of the collar 14 is adjacent the respective surface of the disc-shaped central portion of the lever 3.

The disc-shaped central portion of the lever 3 includes two preferably mirror symmetrical centering portions 15, 16 having convex surfaces 15a, 16a which are closely adjacent or even contact the inner sides 18a, 19a of the sidewalls 18, 19, respectively. The centers of curvature of the convex surfaces 15a, 16a are located on or very close to the axis of the pivot member 4, i.e., in a plane extending longitudinally of the track 1a and including the axis of the member 4. The diameter of the cylindrical surface which includes the convex surfaces 15a, 16a is only slightly smaller than the shortest distance between the inner sides 18a, 19a of the sidewalls 18, 19 (i.e., those sides which are adjacent the track 1a).

The sidewall 19 of the track 1 is provided with a row of preferably (but not necessarily) equidistant elongated slots 20 (hereinafter called sockets) each of which can receive a tooth- or pallet-shaped projection 21 at the free end of a first arm 22 of the two-armed lever 3. The means for biasing the lever 3 in a clockwise direction (as viewed in FIG. 1) comprises a coil spring 23 reacting against the slide 2 and bearing against that side 22b of the arm 22 which faces away from the side 22a carrying the projection 21. The coil spring 23 is received in a pocket 25 of the section 9 and is free to bias the projection 21 against the inner side 19a and into the adjacent socket 20 as soon as the slide 2 is moved along the track 1a to assume a position in which the projection 21 is in register with the selected socket 20.

The apparatus further comprises means for pivoting the lever 3 against the opposition of the coil spring 23. Such pivoting means comprises a second lever 29 which is pivotably mounted on a shaft 30 in the section 10 of the slide 2 and has a first arm 28 extending into a substantially V-shaped cam groove 27 in the second arm 26 of the lever 3. The shaft 30 extends transversely of the track 1a so that the lever 29 is pivotable in the plane which includes the axis of the pivot member 4, and the second or outer arm 31 of the lever 29 extends away from the guide 1 to be readily grasped by the hand of a person who wishes to adjust the level of the deflector D. The free end of the second arm 31 of the lever 29 carries a round knob 32. The free end 33 of the first arm 28 of the lever 29 is received in the junction between the two mutually inclined branches or legs of the V-shaped cam groove 27 when the lever 29 assumes an inoperative position in which the coil spring 23 is free to maintain the projection 21 in contact with the inner side 19a of the sidewall 19 or in a selected socket 20. In order to expel the projection 21 from the selected socket 20 (preparatory to movement of the slide 2 along the track 1a in order to move the projection 21 to a position of register with another socket 20), the operator moves the knob 32 of the second arm 31 of the lever 29 to the right or to the left (as seen in FIG. 2) so that the free end 33 of the arm 28 leaves the junction and enters the one or the other branch or leg of the V-shaped cam groove 27 in the arm 26 of the lever 3. This results in a pivotal movement of the lever 3 in a counterclockwise direction (as seen in FIG. 1), i.e., the cam groove 27 is moved from the solid-line position to the phantom-line position of FIG. 1 and the projection 21 is then located in the track 1a so that the knob 32 can be used as a means for moving the slide 2 and the lever 3 longitudinally of the track 1a until the projection 21 moves to a position of register with a newly selected socket 20. The knob 32 is then released and the spring 23 is free to propel the projection 21 into the newly selected socket 20. The two legs of the illustrated V-shaped groove 27 make an obtuse angle. The slide 2 and the lever 3 are moved up or down, depending on the stature and/or posture of the occupant of the seat S and on the width of the shoulder which is to be engaged by the shoulder belt B.

The means for holding the lever 29 in the inoperative position comprises two leaf springs 35, 36 which are affixed to and react against the section 10 of the slide 2 in order to bear against the second arm 31 of the lever 29. These leaf springs cooperate to bias the lever 29 to that position (shown in FIG. 2 by solid lines) in which the free end 33 of the first arm 28 extends into the junction between the legs of the V-shaped cam groove 27 in the second arm 26 of the lever 3. The leaf springs 35, 36 then cooperate with the coil spring 23 to maintain the projection 21 in the selected socket 20. This is desirable and advantageous because the three springs 23, 35, 36 jointly prevent undesirable expulsion of the projection 21 from the selected socket 20, e.g., in response to abrupt acceleration of the apparatus in the event of an accident.

The sidewall 18 of the guide 1 is provided with a row of preferably (but not necessarily) equidistant elongated slots 40 (hereinafter called recesses) the mutual spacing of which is or can be the same or nearly the same as that of the row of resilient follower 42 having an arcuate portion 41 which rides over the recesses 40 when the slide 2 is caused to move longitudinally of the track 1a and the portion 41 snaps into one of the recesses 40 when the projection 21 is caused to enter a socket 20. The arcuate portion 41 of the follower 42 can produce clicking noises while riding over the recesses 40; this indicates to the operator of the lever 29 that the slide 2 is in motion as well as that the projection 21 is aligned with one of the sockets 20. The follower 42 can but need not form an integral part of the section 9 of the slide 2, depending on the elasticity of the material of the section 9 and on the desired elasticity of this follower.

The apparatus still further comprises means for biasing the slide 2 in one direction longitudinally of the track 1a. The illustrated biasing means comprises a torsion spring 45 which tends to wind itself onto a core on the guide 1 and the free end of which is affixed to the slide 2 to pull the latter in a direction to the left, as seen in FIG. 1 or 2. The torsion spring 45 can include a relatively wide strip (see FIGS. 4, 6 and 7) of spring steel or the like.

It will be seen that, in contrast to the construction of the apparatus which is disclosed in the aforediscussed published German patent application No. 37 13 137, the coil spring 23 serves to permanently bias the arm 22 of the lever 3 in a direction to maintain the projection 21 in abutment with the inner side 19a of the sidewall 19 or in the adjacent socket 20. Moreover, the lever 3 is much less likely to jam than in a conventional apparatus because the convex surfaces 15a, 16a of its centering portions 15, 16 are immediately or closely adjacent the inner sides 18a, 19a of the respective sidewalls 18, 19, i.e., the diameter of a cylindrical surface including the convex portions 15a, 16a is only slightly smaller than the shortest distance between the sidewalls 18 and 19. Such proper centering of the lever 3 between the sidewalls 18, 19 relieves the slide 2 which can be made of a lightweight plastic material because it need not withstand pronounced deforming and/or other stresses. The number of sockets 20 can be selected practically at will so as to enable the operator of the pivoting means (lever 29) to select any one of two, three, four, five or more different levels for the deflector D. When the lever 3 couples the slide 2 to the guide 1, its projection 21 extends into one of the sockets 20 and is urged to remain in such socket by the coil spring 23 as well as by the leaf springs 35, 36, and the convex surfaces 15a, 16a of the centering portions 15, 16 of the lever 3 are immediately adjacent or actually abut the inner sides 18a, 19a of the respective sidewalls 18, 19 to thus ensure that the lever 3 is maintained in an optimum position with reference to the guide 1 and to thus fully or at least substantially relieve the slide 2. The springs 23, 35 and 36 cooperate to ensure that a pull upon the shoulder belt B cannot cause the deflector D to disengage the projection 21 of the lever 3 from the sidewall 19 of the guide 1 when such disengagement is undesirable or dangerous to the occupant of the seat S adjacent the guide 1. The lightweight slide 2 merely serves as a means for ensuring that the lever 3 can be moved along the track 1a to a selected position in which the projection 21 is adjacent a desired socket 20 and can enter such socket as soon as the springs 23, 35 and 36 are capable of pivoting the lever 3 in a clockwise direction (as seen in FIG. 1). The slide 2 need not take up and/or withstand any stresses which develop as a result of tensioning of the shoulder belt B when the lever 3 maintains its projection 21 in a selected socket 20. However, it is clear that, if desired, the slide 2 can be made of a suitable metallic material without departing from the spirit of the invention.

The centering portions 15, 16 of the disc-shaped central portion of the lever 3 ensure that the axis of the pivot member 4 is maintained in an optimum position with reference to the sidewalls 18, 19 of the guide 1, preferably in a plane which extends longitudinally of the tracks 1a substantially or exactly midway between the inner sides 18a, 19a of the sidewalls 18 and 19. Such accurate positioning of the pivot axis for the lever 3 contributes to the ease of penetration of the projection 21 into a selected socket 20 when the lever 3 is permitted to pivot under the action of the spring 23 and the springs 35, 36 are free to maintain the lever 29 of the pivoting means in the inoperative position.

The bias of the spring 23 can be readily selected in such a way that this spring reliably ensures retention of the projection 21 in a selected socket 20 in the event of an accident. The leaf springs 35, 36 assist the coil spring 23 when the lever 29 is free to assume its inoperative position in order to further reduce the likelihood of unintentional disengagement of the lever 3 from the guide 1, for example, in the event of an accident when the improved apparatus is or can be accelerated in a direction which could result in expulsion of the projection 21 from the adjacent socket 20 if the lever 3 were biased by the coil spring 23 alone. The bias of the leaf springs 35, 36 in a direction to maintain the projection 21 of the lever 3 in a selected socket 20 need not be very pronounced because any abrupt acceleration of the lever 3, in whatever direction, is not likely to generate large forces which would tend to expel the projection 21 from the adjacent socket 20.

If the lever 3 comprises a single arm (e.g., the arm 22), the single arm is provided with the projection 21 as well as with the cam groove 27 or with an equivalent of this cam groove to receive the free end 33 of the first arm 28 of the pivoting lever 29. It is presently preferred to employ a two-armed coupling lever 3 with a substantially disc-shaped portion (including the centering portions 15 and 16) between its arms 22 and 26.

An advantage of the V-shaped cam groove 27 is that it ensures disengagement of the projection 21 from the sidewall 19 of the guide 1 in response to pivoting of the arm 31 and knob 32 of the lever 29 in a direction to the right or to the left (as seen in FIGS. 1 and 2), depending on the desired direction of advancement of the slide 2 along the track 1a. If the illustrated V-shaped cam groove 27 is replaced with a simpler cam groove (e.g., with a cam groove including only one branch or leg of the V-shaped groove 27), the lever 29 is pivotable (from its inoperative position) in a single direction in order to disengage the projection 21 from the sidewall 19.

The leaf springs 35, 36 can be replaced by or used jointly with simple detent means or any other suitable means for releasably holding the lever 29 in the inoperative position.

The torsion spring 45 constitutes a desirable but optional feature of the improved apparatus. As stated above, the purpose of this spring is to permanently bias the slide 2 in one direction longitudinally of the track 1a, i.e., the person in charge need not apply any force to move the slide in one direction except to oppose excessive acceleration of the slide 2 under the action of the spring 45. The arrangement may be such that the torsion spring 45 biases the slide 2 toward an upper end position so that the deflector D can be moved to a lower level when the lever 29 is actuated to disengage the projection 21 from the sidewall 19 and to thereupon move the slide 2 downwardly by simultaneously stressing the spring 45.

The resilient follower 42 also constitutes an optional but desirable and advantageous feature of the improved apparatus. This follower produces noise when its arcuate portion 41 enters a recess 40 so that the operator of the lever 29 knows that the projection 21 is in accurate register with a socket 20. Thus, the operator need not repeatedly move the slide 2 up and down in order to accidentally advance the slide 2 to a level at which the projection 21 is aligned with one of the sockets 20. The hand holding the lever 29 can sense that the arcuate portion 41 of the follower 42 has partially entered one of the recesses 40 so that the follower need not generate appreciable noise whenever its portion 41 reaches a recess in the sidewall 18.

The guide 1 can be replaced with a guide or rail having a substantially U-shaped cross-sectional outline. The illustrated C-shaped cross-sectional outline is preferred at this time because the slide 2 and the lever 3 are reliably confined in the track 1a which is in communication with the surrounding atmosphere only by way of a relatively narrow elongated slot (FIG. 3) between the adjacent portions of the sidewalls 18, 19. Such slot is necessary in order to provide room for the central portion of the section 10 of the slide 2.

Figure 4:
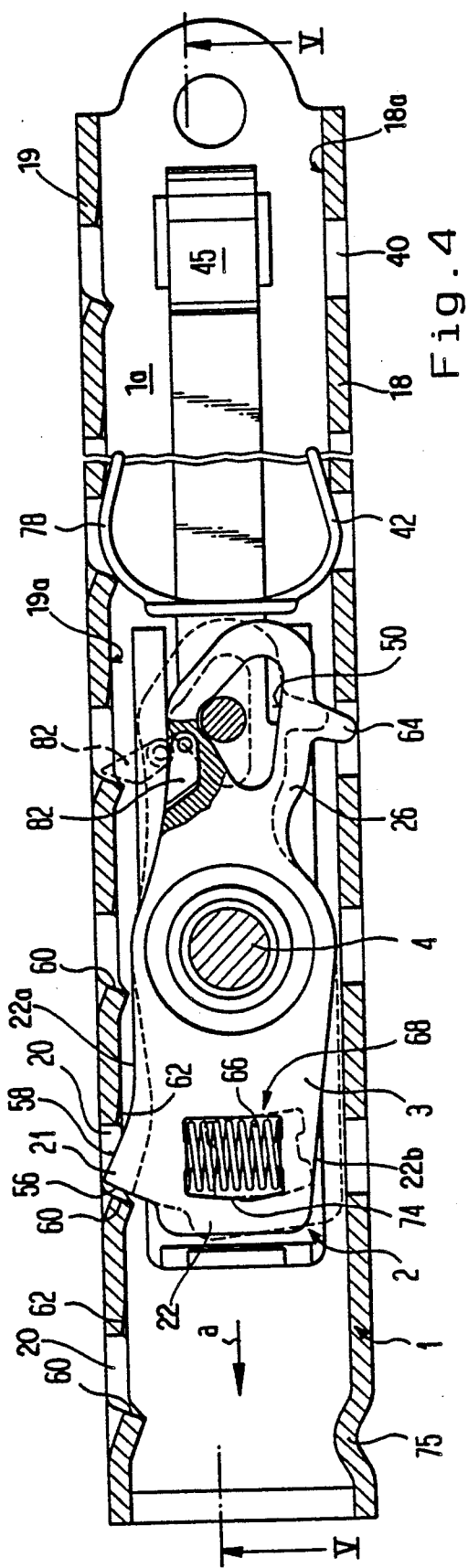
FIG. 4 is a view similar to that of FIG. 1 but showing a portion of a second apparatus wherein the lever of the coupling means carries two projections and an additional lever for engagement with one sidewall of the guide in the event of an accident.
Figure 5:
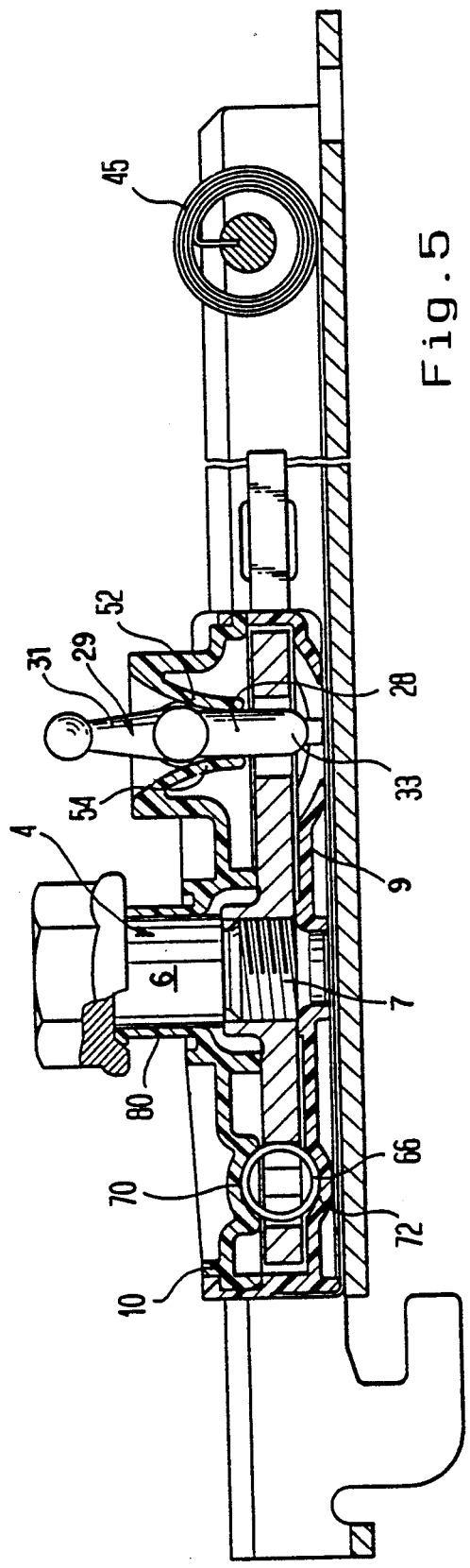
FIG. 5 is a sectional view substantially as seen in the direction of arrows from the line V—V of FIG. 4.

FIGS. 4 and 5 show a portion of a second apparatus. All such parts of this second apparatus which are identical with or clearly analogous to the corresponding parts of the apparatus of FIGS. 1 to 3 are denoted by similar reference characters.

The somewhat modified projection 21 of the lever 3 which is shown in FIGS. 4 and 5 is a tooth having a first flank 56 which exhibits a pronounced inclination with reference to the longitudinal direction of the track 1a, and a second flank 58 with a much less pronounced inclination. The left-hand ends of the sockets 20 in the sidewall 19 of the guide or rail 1 are bounded by surfaces 60 which extend in part into the track 1a to intercept the flank 56 of the oncoming tooth-shaped projection 21 while the slide 2 is caused to advance in the direction of arrow a. The right-hand ends of the sockets 20 are adjacent to ramps 62 which form part of the inner side 19a of the sidewall 19 and serve to steer the projection 21 into the respective sockets 20 while the slide 2 is caused to move in the direction of arrow a. The just described configuration and inclination of the tooth flanks 56, 58, of the surfaces 60 and of the ramps 62 facilitates penetration of the projection 21 into a selected socket 20. The surfaces 60 and the ramps 62 can be formed in a metallic blank which is thereupon converted into the guide 1 of FIGS. 4 and 5.

The means for biasing the arm 22 of the lever 3 in a clockwise direction (as seen in FIG. 4) comprises a coil spring 66 which is received in part in a window-like pocket 68 of the arm 22 and in part in two pockets 74 which are defined by the adjacent arcuate portions 70, 72 of sections 10, 9 of the slide 2. One end convolution of the coil spring 66 reacts against the sections 9, 10 of the slide 2 to urge the other end convolution against the arm 22 which thereby tends to maintain the projection 21 in contact with the inner side 19a of the sidewall 19 or in a selected socket 20, depending on the momentary position of the slide 2 relative to the guide 1.

The lever 3 of FIGS. 4 and 5 comprises a second projection 64 which is provided on the arm 26 substantially or exactly diametrically opposite the projection 21 and extends into one of the recesses 40 when the projection 21 extends into one of the sockets 20. The configuration of the second projection 64 may but need not be identical with that of the projection 21.

The guide 1 of FIGS. 4 and 5 further comprises a stop 75 which can constitute an inwardly extending bent or otherwise deformed portion of the sidewall 18 and is located slightly to the left of the leftmost or last socket 20 of the row of such sockets in the sidewall 19. The purpose of the stop 75 is to extend into the path of movement of that side (22b) of the arm 22 of the lever 3 which faces away from the side 22a (the projection 21 is located at the side 22a) and to pivot the lever 3 clockwise (as seen in FIG. 4) so that the projection 21 is compelled to enter the last (leftmost) socket 20 if it has failed to enter this socket under the action of the spring 66. The stop 75 further serves as a means for preventing total expulsion of the slide 2 from the track 1a in the direction of arrow a, i.e., against the opposition of the torsion spring 45).

The means for pivoting the lever 3 of FIGS. 4 and 5 against the opposition of the coil spring 66 again comprises a lever 29 which is pivotably mounted in the section 10 of the slide 2. The free end 33 of the first arm 28 of the lever 29 extends into a triangular cam groove 50 in the arm 26 of the lever 3. When the lever 29 is maintained in the inoperative position of FIG. 5, the free end 33 of the arm 28 extends into one corner of the triangular cam groove 50; at such time, the spring 66 is free to maintain the projection 21 in contact with the inner side 19a of the sidewall 19 or in a selected socket 20. The means for holding the lever 29 in the inoperative position comprises two leaf springs 52, 54 which react against the slide 2 and bear against the second arm 31 of this lever. The leaf springs 52, 54 cooperate with the coil spring 66 to prevent unintentional expulsion of the projections 21 form a selected socket 20.

The section 10 of the slide 20 is provided with a sleeve 80 which surrounds the smooth cylindrical portion 6 of the pivot member 4. The deflector D (not shown in FIGS. 4 and 5) is mounted for swiveling or pendulum movement about the sleeve 80. This sleeve can form an integral part of the section 10.

The means for collecting the convolutions of the torsion spring 45 is mounted on the guide 1, and the free or outer end portion of this torsion spring is connected to the slide 2 to urge the slide counter to the direction which is indicated by the arrow a.

The section 9 of the slide 2 which is shown in FIGS. 4 and 5 comprises two resilient followers 78 and 42 which are mirror symmetrical to each other with reference to a plane including the axis of the pivot member 4 and extending longitudinally of the track 1a. The follower 78 has an arcuate portion which is slidable along the inner side 19a of the sidewall 19, and the follower 42 has an arcuate portion which is slidable along the inner side 18a of the sidewall 18. Each socket 20 is located opposite a recess 40 (as seen transversely of the track 1a), and the aforementioned arcuate portions of the followers 78 and 42 are caused to ride over successive sockets 20 and recesses 40, respectively, when the slide 2 is caused to advance along the track 1a, either under the bias of the torsion spring 45 or in the opposite direction. The followers 78, 42 are preferably designed to generate a certain noise (clicking) as their arcuate portions ride over the sockets and recesses.

FIG. 4 shows the lever 3 in its operative position by solid lines, i.e., in that position in which the projection 21 extends into one of the sockets 20 and the projection 64 extends into one of the recesses 40. The disengaged position of the lever 3 is shown by phantom lines; the slide 2 is then free to move longitudinally of the track 1a.

The arm 26 of the lever 3 carries an additional lever or pawl 82 which is located substantially opposite the projection 64, i.e., at the same side of the lever 3 as the projection 21) and is designed to pivot from the solid-line position to the broken-line position of FIG. 4 (and to thereby enter one of the sockets 20) in response to abrupt acceleration of the slide 2 and lever 3 in the direction of arrow a. The lever 3 is preferably provided with a depression or cutout into which the additional lever 82 normally extends. The pivotal connection between the levers 3 and 82 is such that the lever 82 will automatically find its way out of the aforementioned depression or cutout if the acceleration of the lever 3 in the direction of arrow a is sufficiently pronounced. In the event of an accident, the additional lever 82 moves to the broken-line position of FIG. 4 and engages the nearest surface 60 in response to movement of the slide 2 in the direction of arrow a. The lever 82 then causes the lever 3 to pivot in a clockwise direction and to introduce its projections 21, 64 into the adjacent socket 20 and recess 40, respectively. In other words, the additional lever 82 pivots clockwise (as seen in FIG. 4) due to its inertia in order to engage a surface 60, and the lever 82 then pivots the lever 3 to ensure reliable engagement between the lever 3 and the guide 1.

An advantage of the coupling lever 3 which is shown in FIGS. 4 and 5 is that its substantially triangular cam groove or slot 50 can be machined and/or otherwise formed at a cost substantially less than the cost of making the V-shaped groove 27 in the lever 3 of FIGS. 1 to 3. The reason is that the end portion 33 of the first arm 28 of the lever 29 need not be guided (in the triangular cam groove 50) with the same degree of accuracy as in the cam groove 50. Another advantage of the pivoting means of FIGS. 4 and 5 is that, if the slide 2 happens to assume a position in which the tooth-shaped projection 21 is not received in one of the sockets 20 but merely bears against the inner side 19a of the sidewall 19, the arm 28 of the lever 29 is disengaged from the surface surrounding the triangular cam groove 50 and the springs 52, 54 cannot stress the lever 3. If the vehicle is involved in an accident at the time the slide 2 is held in the just outlined position (in which the lever 3 is not in positive form-locking engagement with the guide 1), the lever 29 can remain in its momentary position because the spring 66 is free to pivot the lever 3 as soon as the projection 21 moves to a position of register with one of the sockets 20. This results in a desirable shortening of the interval which is required to positively couple the slide 2 to the guide 1 by way of the lever 3.

The flanks 56, 58 of the tooth-shaped projection 21 of the apparatus which is shown in FIGS. 4–5, and the surfaces 60 and ramps 62 of the sidewall 19 contribute to more rapid penetration of the projection 21 into a selected slot under the bias of the spring 66, and in more reliable retention of the projection 21 in the selected socket 20. Moreover, the surfaces 60 which extend into the track 1a reliably ensure that the projection 21 penetrates into the adjacent socket 20 even if the slide 2 happens to advance along the track 1a (in the direction of arrow a) at a speed which is too high to enable the spring 66 to invariably ensure entry of the rapidly advancing projection 21 into the nearest socket 20. The arrow a indicates the direction in which the slide 2 is likely or bound to be accelerated in the event of an accident if, at the time the accident occurs, the projection 21 is not already received in one of the sockets 20.

An advantage of the second projection 64 is that the slide 2 is reliably held (by the projection 21) against movement in the direction of arrow a and (by the projection 64) against movement counter to such direction (as long as the projections 21 and 64 extend into the adjacent socket 20 and the adjacent recess 40, respectively). This is desirable and advantageous because it further reduces the likelihood of undesirable shifting of the slide 2 along the track 1a, even in the event that the vehicle is overturned and comes to a standstill while resting on its roof.

An advantage of the pocket 68 and of the pockets 74 which are defined by the portions 70, 72 of the respective sections 10 and 9 is that the coil spring 66 can be assembled with the lever 3, or with the lever 3 and slide 2, prior to insertion of the slide into the track 1a of the guide 1.

The stop 75 of the guide 1 also constitutes an optional but desirable feature of the apparatus which is shown in FIGS. 4 and 5. This stop not only prevents escape of the slide 2 from the track 1a of the guide 1 but also ensures that the projection 21 of the lever 3 is compelled to penetrate into the last (leaftmost) socket 20 in the sidewall 19.

The two mirror symmetrical resilient followers 78 and 42 of the slide 2 which is shown in FIGS. 4 and 5 contribute to the centering action of the disc-shaped central portion of the lever 3. FIG. 4 shows that the central portion of the lever 3 is not immediately adjacent the inner side of the sidewall 19 because this central portion should be capable of bypassing the innermost portions of surfaces 60 which extend into the adjacent marginal portion of the track 1a. The followers 78 and 42 compensate for such inability of the lever 3 to very closely follow the inner side 19a of the sidewall 19. The two followers 89, 42 even more reliably inform the operator of the lever 29 that the projection 21 has moved to a position of accurate alignment with one of the sockets 20 because the penetration of their arcuate portions into the adjacent sockets 20 and recesses 40, respectively, can be sensed by the hand holding the knob 32. In addition, the followers 78, 42 can generate a certain clicking noise which is also detectable by the person manipulating the lever 29.

An advantage of the sleeve 80 on the section 10 of the slide 2 is that the deflector D need not come in actual contact with the pivot member 4. Therefore, swiveling of the deflector D relative to the sleeve 80 does not result in transmission of undesirable torque to the pivot member 4 and to the lever 3 (the latter is non-rotatably secured to the pivot member). The sleeve 80 renders it possible to assemble the section 10 of the slide 2 with the deflector D prior to insertion of the lever 3 between the sections 9 and 10. The pivot member 4 can be threadedly connected with the lever 3 while the deflector D is already mounted on the sleeve 80. Still another advantage of the sleeve 80 is that it serves as a means for reliably guiding the externally threaded portion 7 of the pivot member 4 into proper engagement with the internal threads of the lever 3, i.e., the sleeve 80 reduces the likelihood of damage to the threads of the pivot member 4 and lever 3 during attachment of the pivot member to the internally threaded central portion of the lever.

FIGS. 6 and 7 show portions of a third apparatus which constitutes a modification of the apparatus of FIGS. 4 and 5. All such parts of the apparatus of FIGS. 6–7 which are identical with or clearly analogous to the corresponding parts of the apparatus of FIGS. 4–5 are denoted by similar reference characters. The pivoting means including the second lever 29 of FIGS. 4–5 is replaced with a pivoting means 180 including a wheel or knob which serves as a means for turning the lever 3 between its operative and inoperative positions. To this end, the wheel or knob 180 (hereinafter called wheel) is non-rotatably connected with the pivot member 4 for the lever 3 and is readily accessible to be engaged by one hand of the person wishing to move the slide 2 longitudinally of the track 1a between the sidewalls 18, 19 of the guide 1. The wheel 180 can constitute a separately produced part which is held (by friction and/or otherwise) on the polygonal head 5 of the pivot member 4. The coil spring 66 (which is mounted in the same way as described with reference to FIGS. 4 and 5) is free to pivot the lever 3 of FIGS. 6–7 clockwise as soon as the wheel 180 has completed an angular movement which is necessary to retract the projection 21 from the adjacent socket 20 and as soon as the slide 2 has been caused to move the projection 21 into register with another selected socket 20. The operator then releases the torque applying force upon the wheel 180 or turns the wheel in the opposite direction to assist the spring 66 in propelling the projection 21 into the newly selected socket 20. At the same time, the projection 64 enters the corresponding recess 40.

The lever 3 carries an additional lever 84 which, however, is not caused to automatically pivot relative to the lever 3 when the slide 2 is abruptly accelerated in the direction of arrow a. Instead, the additional lever 84 is pivotable by a motion transmitting means including a link train 86, 88 which receives motion from the wheel 180. The arrangement is such that the additional lever 84 is caused to pivot relative to the lever 3 and to enter the adjacent socket 20 when the wheel 180 of the means for pivoting the lever 3 is caused to assume its inoperative position. FIG. 6 shows the wheel 180 in the operative position (i.e., the projection 21 is held away from the adjacent socket 20 against the opposition of the coil spring 66), and the link train 86, 88 maintains the additional lever 84 in a depression or recess of the lever 3.

Therefore, the operator can move the slide 2 along the track 1a in the guide 1 in order to place the projection 21 into a position of register with a freshly selected socket 20. The additional lever 84 is then pivoted relative to the lever 3 (e.g., under the action of a coil spring 184 which is shown in FIG. 7). If the spring 66 is free to bias the projection 21 toward the inner side 19a of the sidewall 19 but the projection 21 is not in alignment with a socket 20, the additional lever 84 also abuts the inner side 19a of the sidewall 19. If the vehicle embodying the apparatus of FIGS. 6–7 is involved in an accident during which the slide 2 is abruptly accelerated in the direction of arrow a, the spring 184 propels the free end portion of the additional lever 84 into the nearest socket 20 (see FIG. 7) whereby the lever 84 tends to pivot the lever 3 in a clockwise direction to thereby positively propel the projection 21 into the nearest socket 20 as the slide 2 continues to advance in the direction of arrow a.

The wheel 180 has limited freedom of angular movement relative to the pivot member 4 in order to ensure that the additional lever 84 can be pivoted relative to the lever 3 while the wheel turns with reference to the pivot member 4 and lever 3. To this end, the pivot member has peripheral grooves 90 for inwardly extending protuberances or claws 92 of the wheel 180. The claws 92 extend into the respective grooves 90 with a certain amount of clearance which is necessary to enable the wheel 180 to turn with reference to the pivot member 4 in order to actuate the link train 86, 88 but without changing the angular position of the lever 3.

An advantage of the apparatus which is shown in FIGS. 6 and 7 is that it is not necessary to provide a complex device for pivoting the lever 3 relative to the slide 2 and guide 1. Thus, the wheel 180 is simply placed onto and can transmit torque to the pivot member 4 in order to change the angular position of the lever 3 with simultaneous stressing of the spring 66.

Problems can develop if the occupant restraint system of an automotive vehicle is equipped with a tensioning device for the shoulder belt. The tensioning device is likely to unduly accelerate the slide 2 in the event of an accident so that, if the projection 21 was not received in a socket 20 at the time the accident occurred, the highly accelerated slide 2 is likely to propel the projection 21 beyond the nearest socket 20 and the spring 23 or 66 will be unable to pivot the projection 21 during the short interval which elapses while the rapidly moving projection 21 is ready to enter a socket 20. The aforementioned stop 75 can be said to constitute a safety device which compels the projection 21 to enter the last socket 20 while simultaneously preventing total separation of the slide 2 from the guide 1. The ramps 62 and the surfaces 60 also contribute to greater reliability of penetration of the projection 21 into the nearest socket 20.

The lever 82 constitutes an additional safety device which is actuated in the event of an accident (involving abrupt acceleration of the slide 2 in the direction of arrow a) to reliably propel the projection 21 into the nearest socket 20. As mentioned above, rapid acceleration of the slide 2 in the direction of arrow a can take place in response to the action of the aforementioned belt tensioning device when the vehicle embodying the apparatus of the present invention is involved in an accident. The additional lever 82 is caused to leave its depression or recess in the lever 3 and to assume the broken-line position of FIG. 4 to thus engage the nearest surface 60 and to pivot the lever 3 in a direction to propel the projection 21 into the nearest socket 20.

The additional lever 84 in the apparatus of FIGS. 6 and 7 can be said to constitute a safety device which is used in lieu of the additional lever 82 of FIGS. 4 and 5. The difference is that the wheel 180 can be used to move the lever 84 into the adjacent socket 20 (by way of the link train 86, 88) irrespective of whether or not the projection 21 extends into the adjacent socket 20. The lever 84 is retracted into the depression or recess of the lever 3 when the wheel 180 is caused to assume its operative position, i.e., when the slide 2 is ready to be moved along the track 1a. When the wheel 180 is released, the spring 184 propels the lever 84 to the position of FIG. 7 so that this lever is bound to engage the nearest surface 60 when the slide 2 is propelled in the direction of arrow a whereby the lever 84 pivots the lever 3 which causes its projection 21 to penetrate into the nearest socket 20. If the wheel 180 is released while the projection 21 is not received in a socket 20 and while the free end of the additional lever 84 merely abuts the inner side of the sidewall 19, the lever 84 is compelled to penetrate into the nearest socket 20 as soon as it strikes the respective surface 60. In addition, the nearest ramp 62 of the sidewall 19 enables the spring 184 to pivot the lever 84 in a clockwise direction even before the lever 84 reaches the nearest surface 60. This even further enhances the likelihood of pivoting the lever 3 by way of the lever 84 in a direction to propel the projection 21 into the nearest socket 20 while the slide 2 is caused to abruptly advance in the direction of arrow a.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for changing the level of a deflector for a shoulder belt in an occupant restraint system for a motor vehicle, comprising a guide connectable to the body of a motor vehicle and defining an elongated track which is substantially vertical in upright position of the vehicle, said guide having two sidewalls flanking said track and one of said sidewalls having a plurality of sockets spaced apart from each other in the longitudinal direction of said track; a slide installed in said guide for movement along said track; means for separably coupling said slide to said guide including a lever having at least one arm including a projection adjacent said one sidewall to enter or leave a selected socket in response to pivoting of said lever about an axis which is normal to said track and is disposed substantially midway between said sidewalls; deflector-supporting pivot means defining said axis and secured to said slide, said lever having substantially mirror symmetrical centering portions flanking said pivot means and each closely or immediately adjacent a different one of said sidewalls; means for yieldably biasing said lever for pivotal movement about said axis in a first direction to urge said projection against said one sidewall and into a selected socket in response to movement of said slide along said track to a position in which the projection is in register with the selected socket; and means for pivoting said lever about said axis in a second direction counter to said first direction to thus withdraw said projection from a selected socket preparatory to movement of said slide along said track.

2. The apparatus of claim 1, wherein said track has a constant width as measured transversely of said axis and said centering portions include convex surfaces adjacent the respective sidewalls, said convex surfaces having centers of curvature on said axis.

3. The apparatus of claim 2, wherein said lever comprises a substantially disc-shaped section which includes said centering portions.

4. The apparatus of claim 1, wherein said pivoting means is movable between an operative and an inoperative position, said biasing means being free to maintain said projection in contact with said one sidewall or in a selected socket in the inoperative position of said pivoting means.

5. The apparatus of claim 1, wherein said lever has two arms one of which is provided with said projection and the other of which is engaged by said pivoting means.

6. The apparatus of claim 1, wherein said pivoting means comprises a second lever pivotably mounted in said slide and having a first arm engaging the lever of said coupling means and a second arm which is accessible to facilitate pivoting of said second lever relative to said slide.

7. The apparatus of claim 6, wherein the lever of said coupling means has a substantially V-shaped cam groove for the first arm of said second lever.

8. The apparatus of claim 7, wherein said cam groove has two mutually inclined legs and a junction between said legs, said second lever assuming an inoperative position - in which said biasing means is free to maintain said projection in abutment with said one sidewall or in a selected socket - when said first arm extends into said junction.

9. The apparatus of claim 8, further comprising means for releasably holding said second lever in said inoperative position.

10. The apparatus of claim 9, wherein said holding means comprises at least one spring which reacts against said slide and bears against said second lever.

11. The apparatus of claim 1, further comprising means for biasing said slide longitudinally of said track toward a predetermined position.

12. The apparatus of claim 11, wherein said means for biasing said slide comprises a torsion spring.

13. The apparatus of claim 1, wherein the other of said sidewalls has a plurality of recesses spaced apart from each other in the longitudinal direction of said track, the mutual spacing of said recesses matching or closely approximating the mutual spacing of said sockets and said slide having a resilient follower which tracks said other sidewall, said follower having a portion which extends into one of said recesses when said projection extends into one of said sockets.

14. The apparatus of claim 1, wherein said guide includes a rail having a substantially C-shaped cross-sectional outline.

15. The apparatus of claim 1, wherein said slide contains or consists of a plastic material and includes a plurality of sections which are connected to each other.

16. The apparatus of claim 15, wherein said sections are plastic extrusions or moldings and include elongated shell-shaped first and second sections extending longitudinally of said track, said lever being disposed between said first and second sections.

17. The apparatus of claim 1, wherein said lever of said coupling means has a substantially triangular cam groove and said pivoting means comprises a second lever which is pivotably mounted in said slide and includes a first arm extending into said groove and a second arm which is accessible to facilitate pivoting of said second lever relative to said slide.

18. The apparatus of claim 17, wherein said groove has three corners and said second lever is pivotable to and from an inoperative position - in which said biasing means is free to maintain said projection in abutment with said one sidewall or in a selected socket - when said first arm extends into one of said corners.

19. The apparatus of claim 18, further comprising means for releasably holding said first arm in said one corner.

20. The apparatus of claim 19, wherein said holding means includes at least one spring reacting against said slide and bearing against said second lever.

21. The apparatus of claim 1, wherein said projection comprises a tooth including a first flank having a first inclination with reference to the longitudinal direction of said track and a second flank having a less pronounced second inclination with reference to the longitudinal direction of said track.

22. The apparatus of claim 1, wherein said one sidewall has an inner side adjacent said track and said inner side has ramps adjacent said sockets to direct said projection into the respective sockets when said biasing means is free to urge said projection against said one sidewall and said slide is caused to move longitudinally of said track in a predetermined direction.

23. The apparatus of claim 1, wherein each of said sockets has first and second end portions which are spaced apart from each other in the longitudinal direction of said track, said one sidewall having surfaces bounding the first end portions of said sockets and extending into said track to intercept the oncoming projection while said slide is caused to move along said track in a predetermined direction.

24. The apparatus of claim 1, wherein the other of said sidewalls has a plurality of recesses which are spaced apart from each other in the longitudinal direction of said track, said lever further having a second projection which extends into one of said recesses when said first named projection extends into one of said sockets.

25. The apparatus of claim 24, wherein said projections are disposed substantially diametrically opposite each other with reference to said axis.

26. The apparatus of claim 25, wherein said lever comprises two arms and each of said projections is provided on a different arm of said lever.

27. The apparatus of claim 1, wherein said lever has a first pocket and said slide has at least one second pocket, said biasing means comprising a spring which is received in said pockets to react against said slide and to bear against said lever 28. The apparatus of claim 1, wherein said spring is a coil spring.

29. The apparatus of claim 1, wherein said sockets form a row including a first and a last socket as seen in a predetermined direction longitudinally of said track, said guide having a stop extending into the path of movement of said lever along said track in said predetermined direction to pivot said lever in said first direction and to thereby introduce said projection into said last socket.

30. The apparatus of claim 29, wherein said at least one arm of said lever has a first side and a second side opposite said first side, said projection extending from said first side and said stop extending into the path of movement of said second side of said at least one arm.

31. The apparatus of claim 1, wherein the other of said sidewalls has a plurality of recesses which are spaced apart from each other in the longitudinal direction of said track, said slide having two resilient followers one of which tracks said one sidewall and the other of which tracks said other sidewall, said one follower having a portion which rides over said sockets in response to movement of said slide longitudinally of said track and said other follower having a portion which rides over said recesses in response to movement of said slide longitudinally of said track.

32. The apparatus of claim 31, wherein the mutual spacing of said recesses is at least substantially identical with the mutual spacing of said sockets so that said portion of said one follower rides over a socket while said portion of said other follower rides over a recess.

33. The apparatus of claim 32, wherein each of said sockets is aligned with one of said recesses as seen transversely of said track and said followers are mirror symmetrical to each other with reference to a plane extending longitudinally of said track and including said axis, said portions of said one and said other follower being arranged to generate noise in response to riding over said sockets and said recesses, respectively.

34. The apparatus of claim 1, wherein said slide includes a sleeve which extends from said track and said pivot means includes a portion which is rotatably received in said sleeve.

35. The apparatus of claim 34, wherein said slide includes two elongated sections which extend longitudinally of said track and are connected to each other, said lever being disposed between said sections and said sleeve being provided on one of said sections.

36. The apparatus of claim 1, wherein said pivot means is non-rotatably connected with said lever and said pivoting means includes means for turning said pivot means about said axis.

37. The apparatus of claim 36, wherein said turning means includes a handle having a polygonal outline.

38. The apparatus of claim 36, wherein said turning means is movable about said axis to and from an inoperative position in which said biasing means is free to urge the lever of said coupling means against said one sidewall, and further comprising an additional lever pivotably mounted on the lever of said coupling means and means for transmitting motion from said turning means to said additional lever so as to pivot said additional lever toward said one sidewall in response to movement of said turning means to said inoperative position and to pivot said additional lever away from said one sidewall in response to movement of said turning means from said inoperative position.

39. The apparatus of claim 38, wherein said motion transmitting means comprises a link train.

40. The apparatus of claim 1, further comprising an additional lever pivotably mounted on the lever of said coupling means and operative to engage said one sidewall and enter one of said sockets in response to abrupt movement of said slide along said track in a predetermined direction.

41. The apparatus of claim 40, wherein the lever of said coupling means has a first side confronting said one sidewall and a second side confronting the other of said sidewalls, said projection and said additional lever being disposed at the first side of the lever of said coupling means.

* * * * *